United States Patent [19]

Gustafson

[11] E Re. 30,155

[45] Reissued Nov. 20, 1979

[54] HYDROTREATING OF PETROLEUM DISTILLATES USING SHAPED CATALYST PARTICLES

[75] Inventor: William R. Gustafson, Lincroft, N.J.

[73] Assignee: American Cyanamid Company, Stamford, Conn.

[21] Appl. No.: 957,609

[22] Filed: Nov. 3, 1978

Related U.S. Patent Documents

Reissue of:

[64] Patent No.: 3,990,964
Issued: Nov. 9, 1976
Appl. No.: 580,865
Filed: May 27, 1975

U.S. Applications:

[63] Continuation-in-part of Ser. No. 508,780, Sep. 24, 1974, Pat. No. 3,966,644, which is a continuation-in-part of Ser. No. 385,519, Aug. 3, 1973, abandoned, which is a continuation-in-part of Ser. No. 255,491, May 22, 1972, abandoned.

[51] Int. Cl.[2] ..... C10G 23/02

[52] U.S. Cl. ..... 208/216 PP; 208/254 H

[58] Field of Search ..... 208/216 PP, 216 R, 254 H, 208/135, 112; 252/455 R

[56] References Cited

U.S. PATENT DOCUMENTS

| | | | |
|---|---|---|---|
| 3,674,680 | 7/1972 | Hoekstra et al. | 208/216 R |
| 3,770,617 | 11/1973 | Riley et al. | 208/216 PP |
| 3,857,780 | 12/1974 | Gustafson | 208/135 |
| 3,905,916 | 9/1975 | Riley et al. | 208/216 PP |
| 3,966,644 | 6/1976 | Gustafson | 252/455 R |
| 3,980,552 | 9/1976 | Mickelson | 208/216 PP |
| 4,028,227 | 6/1977 | Gustafson | 208/216 PP |

*Primary Examiner*—George Crasanakis
*Attorney, Agent, or Firm*—Gordon L. Hart

[57] ABSTRACT

There is disclosed a hydrotreating process for petroleum distillate which comprises contacting the distillate with catalyst particles of special shape characteristics in the presence of hydrogen at elevated temperature and pressure.

22 Claims, 15 Drawing Figures

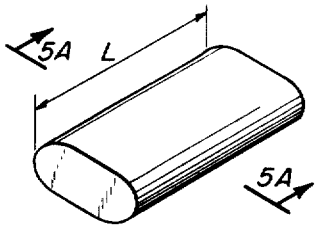
FIG. 5
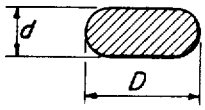
FIG. 5A
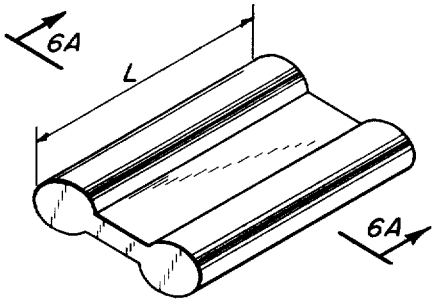
FIG. 6
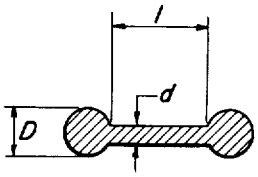
FIG. 6A
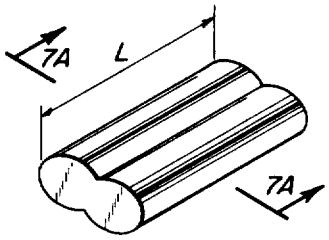
FIG. 7
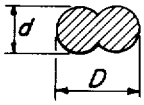
FIG. 7A
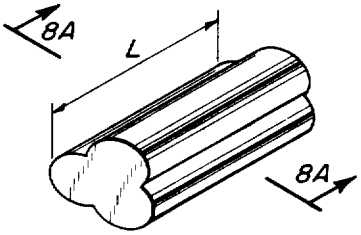
FIG. 8
FIG. 8A
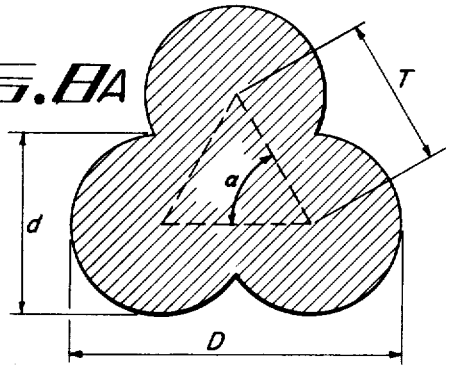
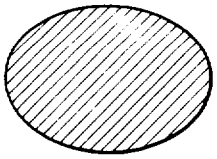
FIG. 9
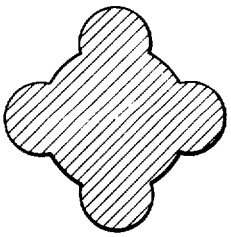
FIG. 10
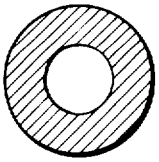
FIG. 11

HYDROTREATING OF PETROLEUM DISTILLATES USING SHAPED CATALYST PARTICLES

Matter enclosed in heavy brackets [ ] appears in the original patent but forms no part of this reissue specification; matter printed in italics indicates the additions made by reissue. [This application is a continuation-in-part of Ser. No. 385,517, filed Aug. 3, 1973, now abandoned which in turn, is a continuation-in-part of Ser. No. 255,491, filed May 22, 1972, now abandoned.]

*This is a reissue of my Pat. No. 3,990,964 patented Nov. 9, 1976 on application Ser. No. 580,865 filed May 17, 1975 which is a continuation-in-part of my application Ser. No. 508,780 filed Sept. 24, 1974, now U.S. Pat. No. 3,966,644 patented June 29, 1976, which is a continuation-in-part of my application Ser. No. 385,519 filed Aug. 3, 1973 and now abandoned, which is a continuation-in-part of my application Ser. No. 255,491 filed May 22, 1972 and now abandoned.*

*The invention is a hydrotreating process for petroleum distillate which comprises contacting the distillate with catalyst particles of special shape characteristics in the presence of hydrogen at elevated temperature and pressure.*

This invention relates to small, shaped, porous catalyst particles useful in hydrotreating petroleum distillates. More particularly, this invention relates to such particles which have concave shaped characteristics and a pore volume constituted by pores, the majority of which have an average diameter in the range of about 40 to 90 angstrom units when measured under specific conditions.

In the past, catalyst materials used in hydrotreating processes were generally of spherical or cylindrical shape. Such convex catalyst particles provided desirable activity for the specific hydrotreating reactions considered at the time. Since the catalyst particles also had desirable physical properties and were readily prepared, little interest was devoted to novel catalyst shapes and sizes. The lack of interest apparently arose because it was felt that smaller particle would cause intolerable pressure drops, that distinctive shape would have adverse effect on physical properties, that no advantage in activity would arise from shape distinctions and that, in fact, any increased void fraction would reduce reactor activity because of the lesser weight of catalyst present per reactor volume, occasioned by the larger void fraction.

Recent shortages in petroleum supplies has necessitated reliance on secondary sources in increasing accounts. These secondary sources require more extensive hydrotreating and are more difficult to process. Use of conventional spherical or cylindrical particles does not result in efficient hydrotreating of secondary sources. Recourse must be had to more effective catalysts for hydrotreating if the shortages are to be alleviated by resource to secondary sources.

In U.S. Pat. No. 3,674,680 issued July 4, 1972 to Hoekstra et al., there is disclosed a process for hydrotreating petroleum residuum by use of small catalyst particles of distinct shape, which at the same time, have a majority of pores having a diameter in the range of 100–200 angstrom units. The catalyst is stated to provide an increased service life over conventional catalyst need in processing residuum and the extended life is thought to be due to the combination of large-pore alumina substrate and the distinctive particle size and shape. Although the reference provides a catalyst of extended service life in residuum processing, it does not provide improved initial activity. Since activity decreases with increasing service use, the extended service life is at a low level of activity.

There continues to exist, therefore, the need for hydrotreating catalysts useful in processing petroleum distillates that not only provide extended service life but also provide improved activity throughout service life of the catalyst particles.

In accordance with the present invention, there is disclosed a process for hydrotreating a petroleum distillate which process comprises contacting said distillate in the presence of hydrogen at a flow rate of about 100 to 1000 standard cubic feet per barrel of distillate, at a temperature in the range of about 500° to 800° F.; at a total pressure in the range of about 100 to 3000 pounds per square inch gauge; and at a liquid hourly space velocity of about 0.5 to 25 reciprocal hour; with a porous catalyst particle of polylobal cross-sectional shape characterized by a concavity index greater than 1.0 and a void fraction in the range of about 0.25 to 0.60; said particle having a ratio of geometric volume to geometric surface in the range of about 0.001 to 0.042 inch; a catalytic surface [rea] *area* greater than about 100 square meter per gram; a catalytic pore volume of between about 0.35 and 0.85 cubic centimeters per gram, said pore volume resulting from a major portion of pores of diameter in the range of about 40 to 90 angstrom units when measured with mercury up to 50,000 pounds per square inch absolute pressure and a contact angle of 140°; and a composition comprising a major portion of alumina; from about 5 to 25 weight percent of molybdenum oxide and from about 1 to 8 weight percent of an oxide selected from cobalt and nickel oxides and mixtures thereof.

In a preferred embodiment, the process is carried out as stated above except that the catalyst particle has a ratio of geometric volume to geometric surface in the range of about 0.01 to 0.042 inch and when containing more than two lobes, at least 15% of the points within the particle are at a distance greater than 0.015 inches from the surface of the particle.

In accordance with the present invention, there is provided an improved hydrotreating process for petroleum distillates wherein the catalyst particle employed exhibits higher activity than is possible with conventional catalyst particles. This result is entirely unexpected in view of the fact that the activity associated with the specific catalyst shape is much greater than is attributable to its particle size and that not all shapes provide the improved activity.

In order that the size and shape characteristics of the catalyst particles may be clearly understood, the following discussion is given.

CONCAVITY INDEX

A geometric solid is convex if all pairs of points lying within or on the surface of the solid can be connected by a straight line which is completely contained within the solid or surface thereof. Conversely, a geometric solid is concave if pairs of points lying within or on the surface of the solid can be connected by a straight line which is not completely contained within or on the surface of the solid. The geometric volume of a convex solid of the minimum size necessary to contain a concave solid will be greater than the geometric volume of the concave solid. Letting $V_x$ equal the volume of the minimum convex solid specified and $V_c$ equal the volume of the contained concave solid, the Concavity Index, C, given by the expression:

$$C=V_x/V_c.$$

In order for the geometric solid to be concave, the value of the Concavity Index must be greater than 1.0. Since the present invention requires concave solids, the Concavity Index must be greater than 1.0 and preferably is about 1.05 to 1.15.

VOID FRACTION

The void fraction represents the closeness of particle packing that can be obtained with particles of a given shape. In a given geometric volume of space, a specific number of catalyst particles can be packed, the number being determined by the size and shape of the particles. Multiplying the geometric volume of an individual particle by the number of particles packed, a total geometric particle volume, $V_p$, is obtained. If the apparent geometric volume of space packed is $V_s$, there will exist void space, $V_v$, not actually occupied by catalyst particles. Thus $V_s=V_p+V_v$. The void fraction, E, associated with a specific particle shape is given by the expression $E=(V_v/V_v+V_p)$. In order for a catalyst particle to be useful in accordance with the present invention, it must have a void fraction in the range of about 0.25 to 0.60, preferably between about 0.35 and 0.50.

RATIO OF GEOMETRIC VOLUME TO GEOMETRIC SURFACE

Catalyst particles of the present invention have a characteristic geometric volume and geometric surface area associated therewith as a consequence of their cross-sectional shape and length. The geometric volume and geometric surface area are readily calculated from appropriate measurements for the perfect geometric forms. Actual catalyst particles approximate these forms and their volumes and surface can be closely estimated from the appropriate geometric model. The ratio of geometric volume to geometric surface area is indicative of particle size and should be in the range of about 0.001 to 0.042 inch, preferably between about 0.005 and 0.025 inch.

Catalyst particles of the present invention are of polylobal cross-sectional shape. This means that the shape is composed of a series of lobes which are united together to form a unitary structure. The lobes are generally of circles of equal diameter. When two lobes are present they may be connected so as to form a "dumbbell" or a "figure eight."The dumbbell shape is that of two circles of equal diameter attached by an elongated central section that is approximately of a width equal the radius of a circle. The figure eight shape is that of two circles of equal diameter connected to each other by spacing of the circle centers from about ⅜ to 15/16 of the length of a circle diameter apart. When more than two lobes are employed, the lobes will be of circles of substantially the same diameter and will intersect adjacent lobes to some extent depending upon the number of lobes employed and the center area of the cross-sectional shape will be of porous alumina base, i.e. it will not be hollow. This requirement is essential to obtain adequate particle strength and results in an increase in the particle thickness in the intersecting region. Thus, although small particles may have all points in the particle less than about 0.015 inch from the surface of the particle, larger particles (i.e., above a ratio $V_p/S_p=0.01$) will have at least about 0.015% of the points at a distance greater than about 0.015 inch from the surface of the particle in order to provide adequate structural integrity.

In addition to the geometric consideration reflecting particle size and shape, it is also necessary for the particles to possess certain characteristics that are associated with catalytic action. These characteristics and methods of measurements are given next.

CATALYTIC SURFACE AREA

The catalytic surface area is expressed in square meters per gram and is determined in accordance with the procedure described by H. W. Doeschner and F. H. Stoss in Anal. Chem., Vol. 34, page 1150, 1962. This value should be greater than 100 square meter per gram, preferably greater than 200 square meters per gram, and more preferably from 250 to 350 square meters per gram.

CATALYTIC PORE VOLUME

The catalytic pore volume of the catalyst particles represents internal cavities therein. Measurements are made by conventional procedures based on mercury penetration at up to 50,000 pounds per square inch absolute pressure using a contact angle of 140°. In this procedure, both total pore volume and pore diameter are determined. Catalyst particles of the present invention will have a total pore volume in the range of about 0.35 to 0.85 cubic centimeters per gram with the majority of the pores having a diameter in the range of about 40 to 90 angstrom units in accordance with the method of determination specified.

In addition to the geometric size and shape relationships, the catalyst particles will also have a specific chemical composition, which is next discussed.

The catalyst particles will comprise a major portion of alumina and, in particular, small-pore alumina so as to be consistent with the catalytic characteristics specified above. The alumina will thus be the major structure-forming component of the catalyst particles. In addition to alumina the catalyst particles may contain up to about 36 weight percent of silica, based on the total weight of silica and alumina. The amount of silica added as such will generally be up to about 5 weight percent, same basis. When added in the form of aluminosilicate, such as a zeolite, it may be as about 45 weight percent of zeolite, thus giving rise to about 36 weight percent of silica as indicated.

The catalyst particles will also contain from about 5 to 25 weight percent of molybdenum oxide and from about 1 to 8 weight percent of an oxide selected from cobalt and nickel oxides and mixtures thereof. These constituents serve as promotor materials and are based on the total weight of the catalyst particle.

In preparing the catalyst particles of the present invention, precipitated alumina is prepared in accordance with conventional procedures, well-known in the art. After filtration, washing, and adjustment in composition as may be desired, the precipitated alumina is spray-dried in accordance with conventional procedures. The spray-dried alumina powder may then be prepared as an extrusion mix, incorporating therein, if desired, the promotor ingredients. Typically, mixmulling is employed in providing the extrusion mix. The extrusion mix is then extruded through a die having orifices of the desired cross-sectional shape and the extrudate is cut to the proper length to provide the desired shape characteristics specified. The extrudate is then subjected to drying and calcination in conformity with conventional procedures. If provision for promoter incorporation was not made prior to extrusion, the calcined extrudate may be suitably treated with promoter materials and again calcined, in accordance with conventional procedures. Advantageously, preparation of catalyst particles of the present invention requires no new processing steps, but merely requires conventional processing directed to the novel combination of geometric, catalytic and compositional features of the catalyst particles as described.

In addition to extrusion, catalyst particles of the present invention may be prepared by other procedures. For example, the shaped particles can be obtained by tabletizing, pelletizing, or molding and the like.

The catalyst particles prepared as described after preliminary sulfiding are useful in hydrotreating petroleum distillates. In hydrotreating reactions, three effects are observed. Hydrodesulfurization, saturation, and nitrogen removal are accomplished. Hydrodesulfurization is generally effected in larger amounts because sulfur contaminants generally predominate but the other reactions will occur in any case. Accordingly hydrotreating is the preferred term used to describe the catalytic reactions effected since it is generic as to the effects observed.

In carrying out the process of the present invention a petroleum distillate is contacted with the catalyst particles described in the presence of hydrogen gas at specified values of temperature, pressure, and space velocity. The catalyst particles are present in the form of a fixed bed and generally several beds in series are employed. The hydrogen gas and distillate are mixed and fed downward through the catalyst bed. Catalyst bed size and distillate flow rate are adjusted to provide a liquid hourly space velocity in the range of about 0.5 to 25 reciprocal hour. Hydrogen flow rate is from about 200 to 10000 standard cubic feet, preferably 200–2000 per barrel of distillate. The reaction temperature is in the range of about 500° to 800° F. and the total pressure is about from 100 to 3000 pounds per square inch gauge.

By using the catalyst particles of the present invention in the hydrotreatment of petroleum distillates according to the process described, improved hydrodesulfurization activity compared to prior art procedures using conventional catalysts is demonstrated. In addition, the catalyst particles of the present invention provide reduced pressure drops across the catalyst bed thereby improving process operability.

The invention will be more fully understood by reference to the accompanying drawings in which:

FIG. 5 is a "plate", a convex catalyst not contemplated by this invention, wherein the dimensions are L=0.186 inch, D=0.094 inch, and d=0.056 inch;

FIG. 5A is a cross section thereof;

FIG. 6 is a dumbbell configuration of this invention wherein the dimensions are L=0.202 inch, D=0.0473 inch, and d=0.0532 inch and FIG. 6A is a cross section thereof;

FIG. 7 is a figure eight configuration of this invention wherein the dimensions are L=0.1814 inch, D=0.092 inch and d=0.0541 inch and FIG. 7A is a cross section thereof;

FIG. 8 is a "three-leaf clover" polylobal configuration of this invention wherein the dimensions are L=0.212 inch, D=0.0919 inch, d=0.0477 inch, T=0.0442 inch, and T=60°;

FIG. 8A is a cross section thereof;

FIG. 9 is an undimensioned oval convex configuration not contemplated by this invention;

FIG. 10 is an undimensioned tetralobal configuration of this invention;

FIG. 11 is an undimensioned ring or "donut" configuration not contemplated by this invention.

Figure 1:
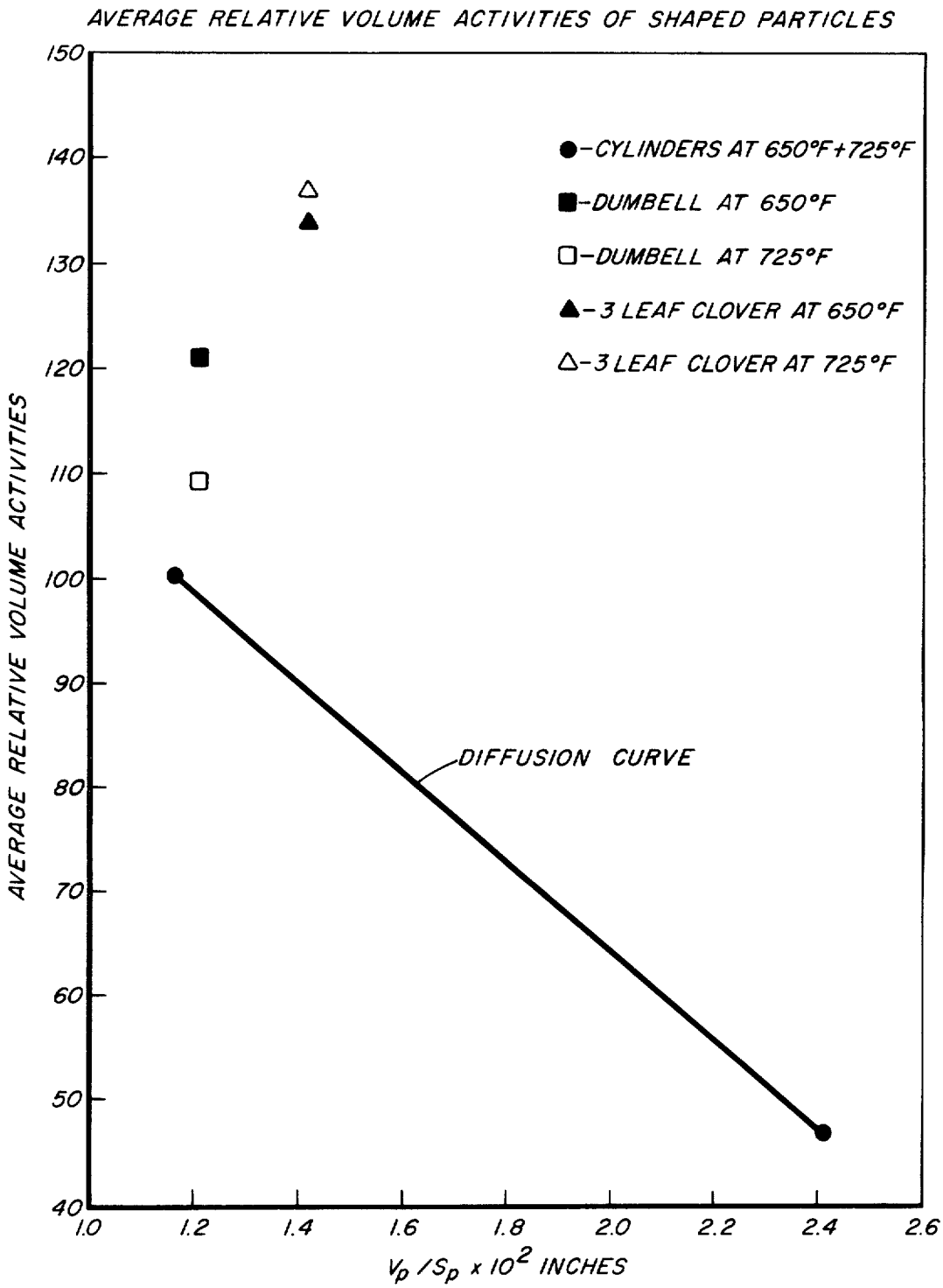
FIG. 1 is a graph comparing the Average Relative Volume Activities of shaped catalyst particles contemplated by the present invention with conventional catalyst particles of the prior art.

The invention is more fully illustrated by examples which follow wherein all parts and percentages are by weight unless otherwise specifically designated.

EXAMPLES 1 and 2

A series of shaped particles were made as follows:

One thousand thirty gallons of water were charged to an agitated tank. Over a period of about 45 minutes, 3,940 pounds of sodium aluminate solution (28% $Al_2O_3$, and about 15% excess $Na_2O$) and 5,430 pounds of aluminum sulfate solution (7.8% $Al_2O_3$) were metered into the water heel. The rates were adjusted so as to hold the pH at about 8.5. When the aluminum sulfate solution was used up, the sodium aluminate solution flow was continued so as to bring the pH up to 10.5. The batch temperature was about 120° F. when the final pH was reached.

The resulting alumina slurry above was filtered and washed (using water at pH 9.0) over a rotary vacuum to remove the sulfate. Nitric acid was added to the repulped washed cake to adjust the pH down to 7.0–7.5. The pH adjusted slurry was washed over another filter to remove the $Na_2O$.

The resulting washed slurry above was spray dried to give a coarse powder.

The spray dried alumina powder (363 pounds) was charged to a muller along with 425 pounds of water. Thereafter 285 pounds of ammonium molybdenate solution (28% $MoO_3$) followed by 108 pounds of cobalt nitrate solution (16% CoO) were added to the mix.

The batch was mixed for a period of about 10–15 minutes, then 75 pounds (ignited basis) of alumina powder is added to the mix. The mix was then mulled for an additional 10–15 minutes.

Using the desired die (shape of extrudate), the muller mix was extruded through an extruder (Welding Engineer Extruder 2010). The extrudates were cut, dried in an oven to about 20% loss on ignition, and then calcined at a temperature of 1200° F. for 1 hour. The extrudates had a promoter content of 3% cobalt oxide and 15% molybdenum oxide by weight based on the weight of the catalyst composition. Four separate batches of extrudates were obtained by use of four different dies, the extrudates differing only in shape since the same muller mix was employed in each instance. Two batches A and B, represented prior art cylindrical shapes of 1/16 and ⅛ inch diameters, respectively. Two additional batches, Examples 1 and 2, represented dumbbell and three leaf clover shapes of the present invention, respectively. Activities of the various shaped extrudates were obtained on a Heating Oil Test described below.

| HEATING OIL TEST<br>HEATING OIL DESCRIPTION | |
|---|---|
| Gravity | 34.2° API |
| Boiling Range | 435–628° F. |
| Sulfur Content | 1.4% |
| Basic Nitrogen | 35 ppm |

The catalyst particles were charged to the reactor on a volume basis. Two 25 cc catalyst beds were used in series. Each of these beds was diluted with glass beads to a total of 55 cc. The beads were separated with a glass wool plug.

The catalyst beds were then presulfided via the following scheme.

1. The catalyst was heated from room temperature to 700° F. in a mixture of 10% $H_2S$ plus 90% $H_2$ by volume flowing at 5 standard cubic feet per hour at atmospheric pressure.
2. The catalyst was then held at 700° F. in this mixture for 1 hour.
3. The reactor temperature was then lowered under flowing hydrogen to 600° F.

The process conditions employed were as follows:
Temperature = 600°, 700° F.
Pressure = 500 psig
Space Velocity = 4LHSV
Hydrogen Recycle Rate = 1000 SCF/Bbl Three samples were collected at each temperature. These samples were scrubbed with caustic, then water, then caustic and finally water again. The samples were then analyzed for sulfur in accordance with the Dohrman Sulfur Method. The activity results are shown in Table I. Physical properties are given in Table II.

The reaction is influenced by diffusion and, accordingly, the size of the catalyst particle affects its activity. Results obtained with the cylindrical particles (1/16 and ⅛ inch extrudates A and B) are used to establish the diffusion curve. Activities obtained with the shaped particles are then compared to the diffusion curve at equal particle size. In order that different particles can be readily compared, particle size is defined in terms of the ratio of geometric volume to geometric surface, $V_p/S_p$.

In this study, two shapes other than cylinders were made. One of these has been designated as the dumbbell, which is illustrated in FIG. 6 of the accompanying drawings. The other has been designated as the three-leaf clover, which is illustrated in FIG. 8 of the accompanying drawings.

The relative activities are defined as the ratio of second order rate constants (catalyst activity) for the catalyst of interest to that of the reference catalyst. The 1/16 inch cylinder is defined to be 100 activity. Relative activities are the percentage of activity of the reference catalyst (1/16 inch cylinder).

Figure 3:
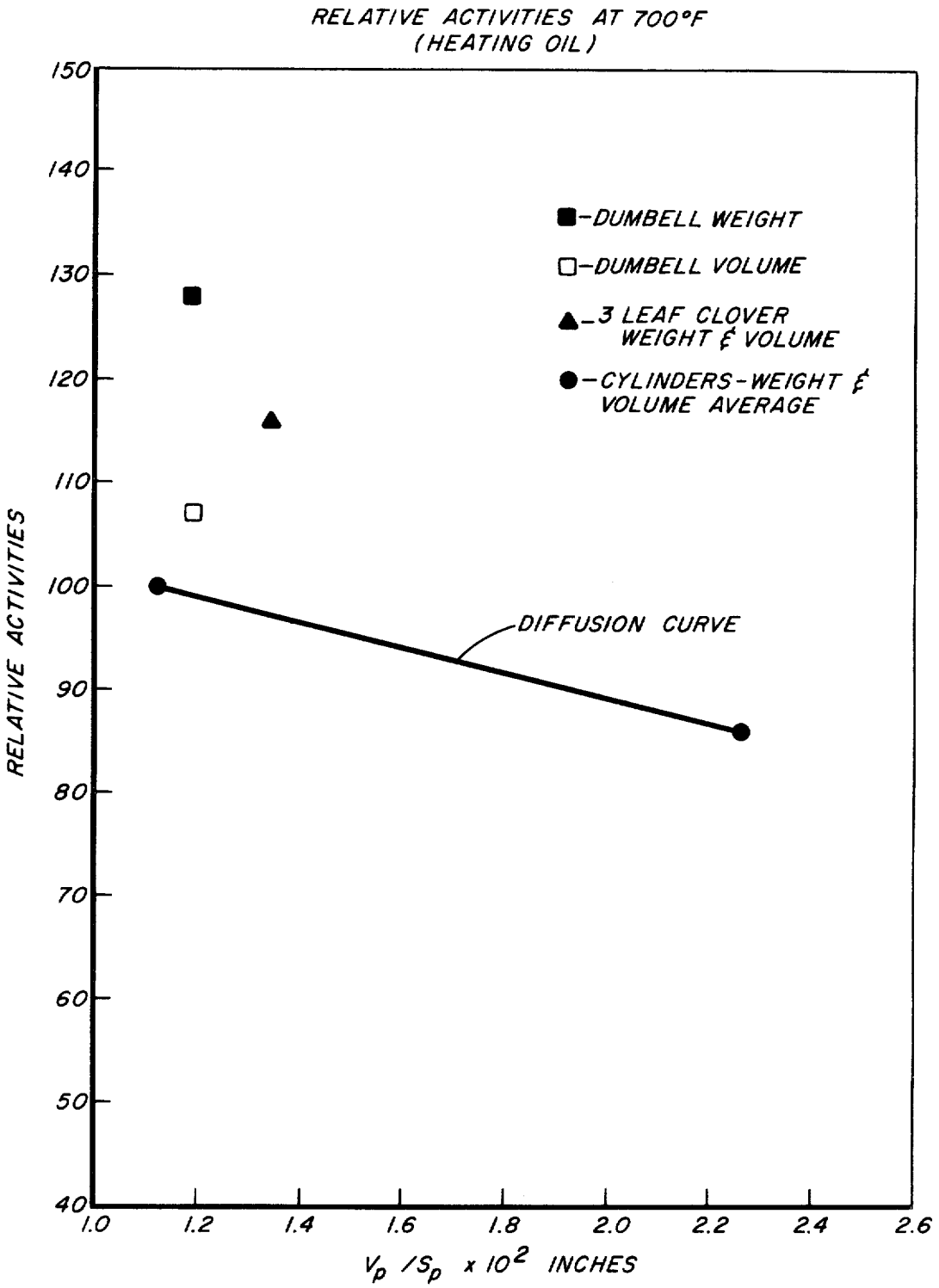
FIG. 3 is a graph comparing the Relative Activities of catalyst particles of the present invention with those of catalyst particles of the same composition having conventional configuration, the comparisons being under prescribed conditions.

The results show an advantage for particles of cross-sectional shape as described by the present invention. A graphical presentation of the data is given in FIG. 3 for the 700° F. runs. Activities of the shaped particles are above the standard diffusion curve.

TABLE I

HEATING OIL RESULTS

| Catalyst ID | | % Sulfur Removal | | % Relative Activities | | | |
|---|---|---|---|---|---|---|---|
| | | | | Volume | | Weight | |
| Example | Description | 600° F. | 700° F. | 600° F. | 700° F. | 600° F. | 700° F. |
| A | "1/16"inch cylinder | 46.1 | 86.5 | 100 | 100 | 100 | 100 |
| 1 | Dumbbell | 43.0 | 87.3 | 88 | 107 | 106 | 128 |
| 2 | 3 Leaf Clover | 49.6 | 88.1 | 115 | 116 | 115 | 116 |
| B | 1/8"Cylinder | 44.0 | 85.0 | 92 | 88 | 87 | 83 |

TABLE II

PHYSICAL PROPERTIES

| Example | Description | Length (in) | Dia (in) | Volume particle Vp (in)$^2$ | Surface particle Sp (in)$^1$ | Vp Sp (in) | PV cc/g | ABD g/cc | CBD g/cc | CS lbs | CS/L lbs/in |
|---|---|---|---|---|---|---|---|---|---|---|---|
| A | "1/16"inch Cylinder | .142 | .053 | .000316 | .0282 | .0112 | .50 | .71 | .76 | 12.3 | 93 |
| 1 | Dumbbell | .177 | — | .000838 | .0704 | .0119 | .50 | .60 | — | — | — |
| 2 | 3 Leaf Clover | .180 | — | .000933 | .0695 | .0134 | .51 | .70 | .74 | 23.3 | 174 |
| B | 1/8"Cylinder | .201 | .115 | .00209 | .0934 | .0224 | .51 | .74 | .78 | 27.7 | 223 |

EXAMPLES 3–6

Additional extrudates were prepared following the procedure of Examples 1 and 2, except that the content of promoter materials was adjusted to provide 6% CoO and 12% $MoO_3$ by weight based on the weight of the catalyst composition. The extrudates were tested in two series using the following described Gas Oil Test for desulfurization and denitrogenation.

| GAS OIL TEST<br>GAS OIL DESCRIPTION | |
|---|---|
| Gravity | = 23.3° API |
| Boiling Range | = 490–847° F. |
| Sulfur Content | = 1.0% |
| Basic Nitrogen Content | = 515 ppm |

The catalyst was charged into the reactor on a volume basis. Two 25 cc catalyst beds were used in series. Each of these beds was diluted with glass beads to a total of 100 cc. The beds were separated by a glass wool plug.

The catalyst was then presulfided as follows:

1. The reactor was heated to 600° F. in flowing nitrogen at atmospheric pressure.
2. At 600° F. the nitrogen was stopped and a mixture of 90% $H_2$ and 10% $H_2S$ by volume was passed over the catalyst at 0.85 SCF/hr. for 30 minutes.
3. The reactor temperature was then raised to 700° F. and held for 2 hours with $H_2/H_2S$ mixture as in 2 above.
4. After 2 hours the reactor temperature was reduced to 450° F. with $H_2/H_2S$ flowing. This completed the presulfiding.

Processing was then carried out under the following conditions:

Temperature=650° and 725° F.
Pressure=750 psig
Space Velocity=2LHSV
Hydrogen Recycle Rate=6000 SCF/Bbl Three samples were collected at each temperature. These samples were scrubbed with nitrogen and then a portion was analyzed for basic nitrogen by U.O.P. method 269-59. The remaining portion of the sample was washed with distilled water three times, then analyzed for sulfur by the Dohrman Method.

In this study two shapes other than cylinders were employed. one of these has been designated as the dumbbell and is illustrated in FIG. 6 of the drawings. The other has been designated as the three-leaf clover and is illustrated in FIG. 8 of the drawings.

In Table III set forth below activity results for these catalysts are shown. Equal volumes of the catalysts are charged and both sulfur and nitrogen removals are measured at two temperatures as described above. Calculations have shown that at both 650° and 725° F., the reactor operates in the "trickle" phase (hydrocarbon exists as both liquid and vapor). In Series I (Catalysts C, D, 3 and 4) the catalysts were muffle calcined in a common batch. In Series II (Catalysts E, 5, and 6) the catalysts were rotary calcined in separate batches. Activity results are given in terms of percentage removals and relative activities on both a weight and volume basis.

In Series I both the relative weight and volume sulfur activities of the shaped particles are greater than the 1/16 inch cylinder. In series II, with the exception of one data point which is not believed to be statistically significant, a similar advantage for sulfur removal is evident. Although the two series do not agree exactly (possibly due to differences in the method of calcination) their average results show that the shaped particles have more sulfur removal activity on both a weight and vo'ume basis.

In T ble IV set forth below the physical properties of the c lysts are given. The significant dimension in terms generalized particle size is the $V_p/S_p$ ratio. This ratio shows that the order of increasing size is:

1/16 inch cyl. < dumbbell < three-leaf clover < ⅛ inch cyl.

With respect to reactions wherein diffusion into catalyst particles is important, the relative activities should increase with decreasing ratios of $V_p/S_p$. The Gas Oil Test results, however, show an unexpected advantage for shaped particles, that is their activity is greater than that attributable to their ratio of $V_p/S_p$. If another mode of action such as bulk mass transfer is affecting activity, than the Gas Oil Test results would be expected to correlate with total geometric surface (total surface in Table IV). However, no such correlation is evident and again an unexpected advantage arises for shaped particles. The ABD (Apparent Bulk Density) values show that the dumbbells pack much more loosely than do the other particles.

In FIG. 1 of the accompanying drawings, the average relative volume activities are plotted versus particle size as expressed by the ratio of $V_p/S_p$. The straight line shown is the diffusion curve obtained from the two cylinder sizes and agrees well with theory. The activity values for both the dumbbell and the three-leaf clover are well above this curve, a highly unexpected result. The dumbbell-shaped catalyst particle is not as active as that of the three-leaf clover shape on this volume basis but this is felt to be due at least in part to its lower apparent bulk density (ABD).

Figure 2:
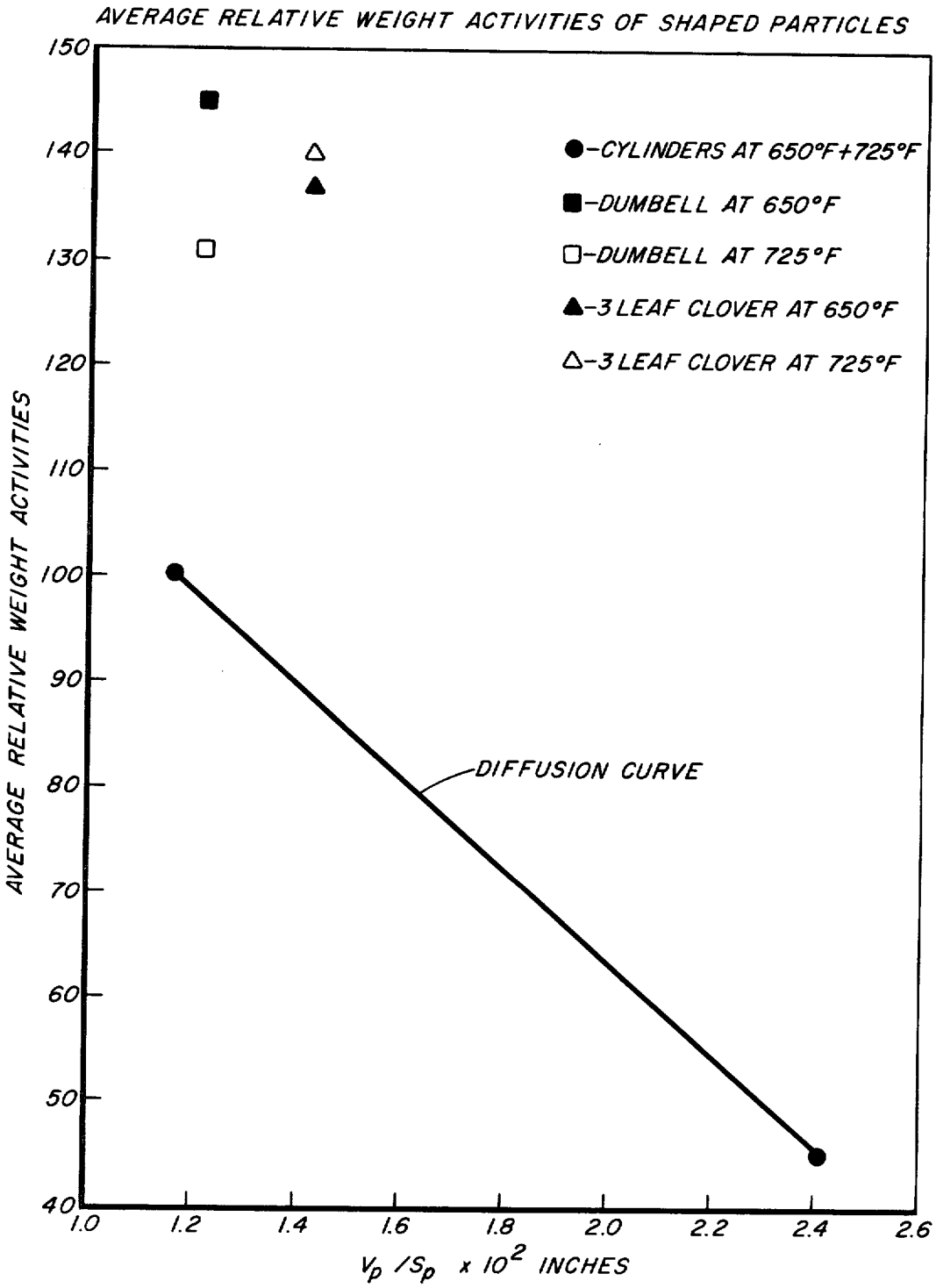
FIG. 2 is a graph comparing the average Relative Weight Activities of the same catalyst particles considered in FIG. 1.

A similar graph for weight activities is shown in FIG. 2. Both shapes are responsible for activities which are significantly above the diffusion curve and of approximately the same value. Again the results are highly unexpected.

Finally, in Table V data are given for pressure drop for shaped particles compared to the 1/16 inch cylinders. Both absolute and relative pressure drop as a function of flow rate are given. In this test 50 cc. of catalyst are loaded into a tube and the pressure drop from flowing air is measured. Both shaped particles of this invention show about the same pressure drops and a considerable advantage compared to the 1/16 inch cylinder (about 40% lower at the more important flow condition). For the dumbbell, the lower pressure drop is a direct result of its low ABD. For the three-leaf clover, the lower pressure drop is a result of its increased size (Vp/Sp) and slightly lower ABD.

EXAMPLE 5

Using the same catalyst material as was used in Examples 3 and 4 and the same test, additional catalyst particle were prepared. The catalyst particles were rotary calcined as were the Series II catalysts in Table III hereinabove. Results are given in Table VI.

EXAMPLE F

The procedure of Example 5 is followed except for catalyst cross-sectional shape. Results are given in Table VI.

TABLE III

GAS OIL TEST ACTIVITY RESULTS

| Catalyst | % Removals | | | | Relative Activities | | | | | | | |
|---|---|---|---|---|---|---|---|---|---|---|---|---|
| | | | | | Volume Basis | | | | Weight Basis | | | |
| | Sulfur | | Nitrogen | | Sulfur | | Nitrogen | | Sulfur | | Nitrogen | |
| Description | 650° F. | 725° F. | 650° F. | 725° F. | 650° F. | 725° F. | 650° F. | 725° F. | 650° F. | 725° F. | 650° F. | 725° F. |
| SERIES I | | | | | | | | | | | | |
| Example | | | | | | | | | | | | |

TABLE III-continued

GAS OIL TEST ACTIVITY RESULTS

| Catalyst | | % Removals | | | | Relative Activities | | | | | | | |
|---|---|---|---|---|---|---|---|---|---|---|---|---|---|
| | | | | | | Volume Basis | | | | Weight Basis | | | |
| | | Sulfur | | Nitrogen | | Sulfur | | Nitrogen | | Sulfur | | Nitrogen | |
| | Description | 650° F. | 725° F. | 650° F. | 725° F. | 650° F. | 725° F. | 650° F. | 725° F. | 650° F. | 725° F. | 650° F. | 725° F. |
| C | "1/16"Cylinder | 85.6 | 97.5 | 0 | 30.6 | 100 | 100 | — | 100 | 100 | 100 | — | 100 |
| 3 | Dumbbell | 86.8 | 98.1 | 0 | 25.2 | 111 | 133 | — | 79 | 130 | 159 | — | 93 |
| 4 | 3 Leaf Clover | 86.3 | 97.1 | 16 | 33.2 | 106 | 114 | — | 110 | 109 | 117 | — | — |
| D | "1/8"Cylinder | 71.6 | 95.2 | — | — | 42 | 51 | — | — | 41 | 49 | — | — |
| SERIES II | | | | | | | | | | | | | |
| Example | | | | | | | | | | | | | |
| E | "1/16"Cylinder | 82.2 | 97.6 | — | — | 100 | 100 | — | — | 100 | 100 | — | — |
| 5 | Dumbbell | 85.8 | 97.2 | — | — | 131 | 85 | — | — | 159 | 103 | — | — |
| 6 | 3 Leaf Clover | 88.2 | 98.5 | — | — | 162 | 161 | — | — | 164 | 163 | — | — |
| AVERAGE I & II | | | | | | | | | | | | | |
| "1/16"Cylinder | | — | — | — | — | 100 | 100 | — | — | 100 | 100 | — | — |
| Dumbbell | | — | — | — | — | 121 | 109 | — | — | 145 | 131 | — | — |
| 3 Leaf Clover | | — | — | — | — | 134 | 137 | — | — | 137 | 140 | — | — |
| "1/8"Cylinder | | — | — | — | — | 42 | 51 | — | — | 41 | 49 | — | — |

TABLE IV

PHYSICAL PROPERTIES

| Catalyst | | Length | Dia | Volume Particle Vp | Surface Particle Sp | Vp Sp | Total Surface area | PV | ABD | CBD | CS | CS/L |
|---|---|---|---|---|---|---|---|---|---|---|---|---|
| Example | Description | (in) | (in) | $(in)^3$ | $(in)^2$ | (in) | $(in)^2$ | cc/g | g/cc | g/cc | lbs | lbs/in |
| C | "1/16"Cylinder | 0.216 | 0.052 | 0.00046 | 0.0398 | 0.0117 | 178 | 0.55 | 0.66 | 0.72 | 21.5 | 172 |
| 3 | Dumbbell | 0.202 | — | 0.00096 | 0.0798 | 0.0121 | 124 | 0.56 | 0.57 | 0.60 | — | — |
| 4 | 3 Leaf Clover | 0.212 | — | 0.00111 | 0.0782 | 0.0142 | 128 | 0.57 | 0.65 | 0.69 | 31.3<br>250 | |
| D | "1/8"Cylinder | 0.215 | 0.125 | 0.00262 | 0.1084 | 0.0241 | — | .57 | .67 | .73 | 29 | 232 |

TABLE V

PRESSURE DROP

Figure 4:
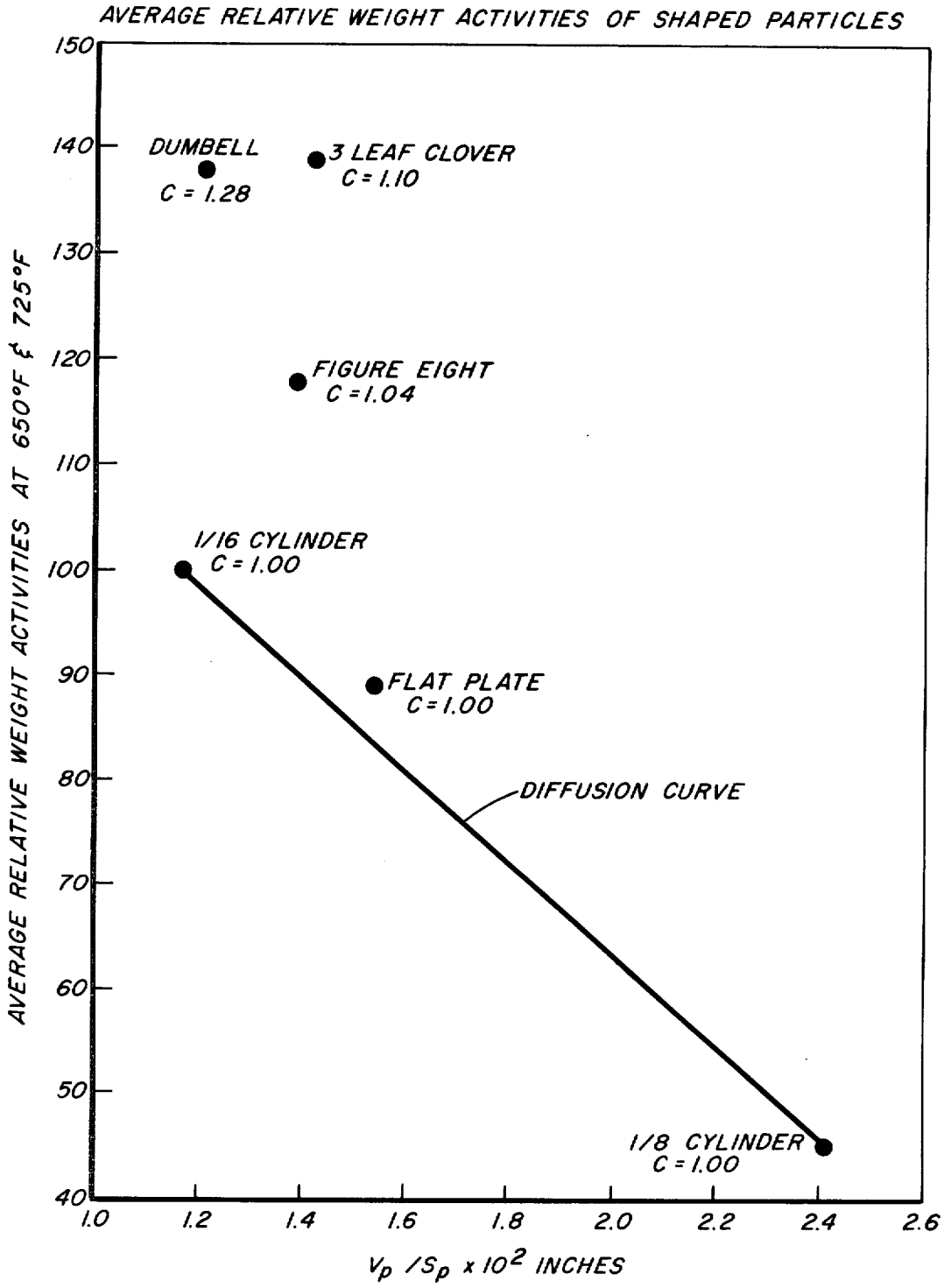
FIG. 4 is a graph comparing the Average Relative Weight Activities of catalyst particles of the present invention with conventional catalyst particles of like composition.

| Nominal Air Flow SCFM | C "1/16"Cylinder ΔP "$H_2O$ | C Relative $\Delta P_1$% | 3 Dumbbell ΔP "$H_2O$ | 3 Dumbbell Relative $\Delta P_1$% | 4 3 Leaf Clover ΔP "$H_2O$ | 4 3 Leaf Clover Relative $\Delta P_1$% |
|---|---|---|---|---|---|---|
| 0' | 1.5 | 100 | 0.94 | 61 | 0.98 | 64 |
| 1 | 4.0 | 100 | 2.6 | 64 | 2.6 | 64 |
| 2 | 15.7 | 100 | 11.2 | 71 | 11.1 | 71 |
| 3 | 36.4 | 100 | 27.0 | 75 | 26.3 | 72 |

average results from catalyst A and Catalyst B were used to calculate the relative activities in Table VI. To simplify the data interpretation the average relative weight activities (650° and 725° F.) is plotted as a function of particle size in FIG. 4. In general those particles with a concavity index, C, equal to 1.00 fall on the diffusion curve. The figure eight with C=1.04 falls above the diffusion curve but not as high as those with C=1.10 or greater. These data tend to support the hypothesis that C must be greater than 1.00. FIG. 4 demonstrates that. Preferably, C should be in the neighborhood of 1.10.

TABLE VI

GAS OIL TEST ACTIVITY RESULTS

| Catalyst | | % Sulfur Removal | | % Relative Activities Volume | | % Relative Activities Weight | | Vp/Sp | Concavity |
|---|---|---|---|---|---|---|---|---|---|
| Example | Description | 650° F. | 725° F. | 650° F. | 725° F. | 650° F. | 725° F. | in | C |
| 5 | Figure Eight | 86.2 | 97.8 | 117 | 112 | 120 | 115 | 0.139 | 104 |
| F | Flat Plate | 85.3 | 96.9 | 110 | 78 | 104 | 74 | 0.154 | 100 |

TABLE VII

PHYSICAL PROPERTIES

| Example | Description | Length (in) | Dia (in) | Vp $(in)^2$ | Sp $(in)^2$ | Vp/Sp in | PV cc/g | ABD g/cc | CBD g/cc | CS lbs | CS/L lbs/in |
|---|---|---|---|---|---|---|---|---|---|---|---|
| 5 | Figure Eight (FIG. 1 Drawings) | 181 | — | 000756 | 0544 | 0139 | 55 | 64 | 71 | 52 | 415 |
| F | Flate Plate (FIG. 5 Drawings) | 187 | — | 000874 | 0567 | 0154 | 56 | 68 | 72 | 57 | 455 |

In Examples 5 and F above, the shapes studied were a figure eight with a small amount of concavity, C=1.04, and a flat plate which is convex C=1.00, but with a noncircular cross section and not of the present invention. These results are shown in Table VI. The It will be apparent that the above described invention and parameters relates to freshly prepared catalyst particles of unique size and shape and does not contemplate conventional catalyst shapes and size having imperfection therein of the type that may be described as knicks, chips, abrasions, bends and the like.

I claim:

1. A process for hydrotreating a petroleum distillate to remove sulfur-containing and nitrogen-containing components with a porous catalyst particle of given length and polylobal cross-sectional shape characterized by a concavity index of greater than 1.0, a void fraction in the range of about 0.25 to 0.60; said particle having a ratio of geometric volume to geometric surface in the range of about 0.001 to 0.042 inch; a catalytic surface area greater than about 100 square meter per gram; a catalytic pore volume of between about 0.35 and 0.85 cubic centimeters per gram, said pore volume resulting from a major portion of pores of diameter in the range of about 40 to 90 angstrom units when measured with mercury up to 50,000 pounds per square inch absolute pressure and a contact angle of 140°, and a composition comprising a major portion of alumina, from about 5 to 25 weight percent of molybdenum oxide and from about 1 to 8 weight percent of an oxide selected from cobalt and nickel oxides and mixtures thereof: said process comprising contacting said distillate with said catalyst particle and hydrogen at a hydrogen flow rate of about 100 to 10000 standard cubic feet per barrel of distillate at a liquid hourly space velocity of about 0.5 to 25 reciprocal hour, a temperature in the range of about 500° to 800° F. and a total pressure in the range of about 100 to 3000 pounds per square inch gauge.

[2. A process for hydrotreating a petroleum distillate to remove sulfur-containing and nitrogen-containing components with a porous catalyst particle of given length and polylobal cross-sectional shape characterized by a concavity index of greater than 1.0, a void fraction in the range of about 0.25 to 0.60, and when containing more than two lobes at least 15% of the points within said particle being greater than about 0.015 inch from the particle surface; said particle having a ratio of geometric volume to geometric surface in the range of about 0.01 to 0.042 inch; a catalytic surface area greater than about 100 square meter per gram; a catalytic pore volume of between about 0.35 and 0.85 cubic centimeters per gram, said pore volume resulting from a major portion of pores of diameter in the range of about 40 to 90 angstrom units when measured with mercury up to 50,000 pounds per square inch absolute pressure and a contact angle of 140°, and a composition comprising a major portion of alumina, from about 5 to 25 weight percent of molybdenum oxide and from about 1 to 8 weight percent of an oxide selected from cobalt and nickel oxides and mixtures thereof: said process comprising contacting said distillate with said catalyst particle and hydrogen at a hydrogen flow rate of about 100 to 10000 standard cubic feet per barrel of distillate at a liquid hourly space velocity of about 0.5 to 25 reciprocal hour, a temperature in the range of about 500° to 800° F., and a total pressure in the range of about 100 to 3000 pounds per square inch gauge.]

[3. The process of claim 1 wherein said hydrogen flow rate is 200–2000 standard cubic feet per barrel of distillate.]

4. The process of claim 1 wherein said liquid hourly space velocity is 2 reciprocal hours.

5. The process of claim 1 wherein said temperature is 650° F.

6. The process of claim 1 wherein said temperature is 725° F.

7. The process of claim 1 wherein said total pressure is 750 pounds per square inch gauge.

[8. The process of claim 1 wherein said hydrogen flow rate is 6000 standard cubic feet per barrel of distillate, said liquid hourly space velocity is 2 reciprocal hours, said temperature is 625° F., and said total pressure is 750 pounds per square inch gauge.]

[9. The process of claim 1 wherein said hydrogen flow rate is 6000 standard cubic feet per barrel of distillate, said liquid hourly space velocity is 2 reciprocal hours, said temperature is 725° F., and said total pressure is 750 pounds per square inch gauge.]

10. The process of claim 1 wherein said catalyst particle is of three-leaf clover cross-sectional shape.

11. The process of claim 1 wherein said catalyst particle is of dumbbell cross-sectional shape.

*12. In a process for hydrotreating petroleum distillate to remove sulfur-containing and nitrogen-containing components by contacting said distillate with hydrogen under pressure, temperature and hydrogen flow rate suitable for such hydrotreating, and with porous hydrotreating catalyst particles comprising a major portion of alumina and hydrotreating promoting amounts of molybdenum oxide and other oxide selected from cobalt oxide, nickel oxide and mixtures thereof, the improvement wherein said catalyst particles having a given length and polylobal cross-sectional shape characterized by a concavity index greater than 1.0, a void fraction in the range of about 0.25 to 0.60, ratio of geometric volume to geometric surface in the range of about 0.001 to 0.042 inch and catalytic pore volume between about 0.35 and 0.85 cubic centimeters per gram, said pore volume resulting from a major portion of pores having a diameter in the range of about 40 to 90 angstrom units when measured with mercury up to 50,000 pounds per square inch absolute pressure and a contact angle of 140°.*

*13. The process of claim 12 wherein the surface area of said catalyst is greater than 200 square meters per gram.*

*14. The process of claim 12 wherein the petroleum distillate is heating oil or gas oil.*

*15. The process of claim 14 wherein the surface area of the catalyst is greater than 200 square meters per gram.*

*16. The process of claim 12 wherein the liquid hourly space velocity is 2.*

*17. The process of claim 12 wherein said temperature is 650° F.*

*18. The process of claim 12 wherein the temperature is 725° F.*

*19. The process of claim 12 wherein the pressure is 750 pounds per square inch gauge.*

*20. The process of claim 12 wherein said catalyst particle is of three-leaf clover cross-sectional shape.*

*21. The process of claim 12 wherein said catalyst particle is of dumbbell cross-sectional shape.*

*22. The process of claim 14 wherein said temperature is 600° to 725° F.*

*23. The process of claim 22 wherein said pressure is 500 to 750 pounds per square inch.*

*24. The process of claim 23 wherein the surface area of said catalyst is greater than 200 square meters per gram.*

*25. The process of claim 24 wherein the liquid hourly space velocity is 2 to 4.*

*26. The process of claim 25 wherein said hydrogen flow rate is 1000 standard cubic feet per barrel of catalyst.*

* * * * *